United States Patent [19]

Ota

[11] Patent Number: 5,378,533
[45] Date of Patent: Jan. 3, 1995

[54] ELECTRICALLY CONDUCTIVE EXOTHERMIC COMPOSITION COMPRISING NON-MAGNETIC HOLLOW PARTICLES AND HEATING UNIT MADE THEREOF

[75] Inventor: Takashi Ota, Takarazuka, Japan

[73] Assignee: Fujii Kinzoku Kako Co., Ltd., Osaka, Japan; a part interest

[21] Appl. No.: 941,687

[22] Filed: Sep. 8, 1992

Related U.S. Application Data

[63] Continuation-in-part of Ser. No. 551,161, Jul. 11, 1990, abandoned.

[30] Foreign Application Priority Data

Jul. 17, 1989 [JP] Japan ................................ 1-182419

[51] Int. Cl.$^6$ ................................ B32B 5/16
[52] U.S. Cl. ................................ 428/304.4; 219/200; 252/512; 252/514; 252/518; 428/307.3; 428/308.4; 428/325; 428/327; 428/403; 428/406; 428/913
[58] Field of Search ................ 428/307.3, 308.4, 325, 428/327, 304.4, 406, 403, 434, 474.4, 458, 913; 252/518, 514, 512; 219/200

[56] References Cited

U.S. PATENT DOCUMENTS

| | | | |
|---|---|---|---|
| 4,419,279 | 12/1983 | Abrams | 428/403 X |
| 4,621,024 | 11/1986 | Wright | 428/404 |
| 4,624,798 | 11/1986 | Gindrup et al. | 428/403 X |
| 4,818,607 | 4/1989 | Richborn et al. | 428/406 |
| 4,857,384 | 8/1989 | Mio et al. | 428/164 |
| 4,888,135 | 12/1989 | Tsunaga et al. | 428/403 X |
| 4,939,038 | 7/1990 | Inabata | 428/402 |
| 5,062,146 | 10/1991 | Kagechika | 392/432 |

FOREIGN PATENT DOCUMENTS 54-149758 11/1979 Japan.
60-59131 12/1985 Japan.

*Primary Examiner*—Paul J. Thibodeau
*Assistant Examiner*—H. Thi Lê
*Attorney, Agent, or Firm*—Stephen F. K. Yee

[57] ABSTRACT

An electrically-conductive fine particle powder comprises fine, hollow spherical particles of non-magnetic material such as glass or resin plated with a metal and having a bulk density of 0.2 to below 0.9 g/cm$^3$. An exothermic electrically-conductive coating or paste comprises the above powder and a synthetic resin binder. An electrically-conductive heating unit is formed from a suitably shaped solid or solid surface coated or impregnated with the above coating or paste and is operable at low voltages.

3 Claims, 2 Drawing Sheets

ELECTRICALLY CONDUCTIVE EXOTHERMIC COMPOSITION COMPRISING NON-MAGNETIC HOLLOW PARTICLES AND HEATING UNIT MADE THEREOF

CROSS REFERENCE TO RELATED APPLICATION

This application is a continuation-in-part of Applicant's application Ser. No. 07/551,161, filed July 1990, now abandoned.

BACKGROUND OF THE INVENTION

1. Field of the Invention

The present invention relates to an exothermic electrically-conductive coating or paste and a heating unit incorporating the same, and more particularly to a heating unit having an exothermic, electrically-conductive coating which is operable at low voltages.

2. Related Art

Various conductive heating units, each of which comprises an electrically-conductive sheet or coating film containing a fine conductive powder and a binder, have previously been known, and in Japanese Patent Unexamined Publication Nos. 670-59131/1985 and 54-149758/1979, a fine powder of carbon black, graphite, a metal or a metal oxide has been used as the fine conductive powder.

Prior art conductive heating units using carbon black or graphite as the fine conductive powder can be used at commercial voltages of 100 to 200 v, but can not be used at low voltages of 1.2 to 24 v which are applied, for example, when batteries are used as power sources, because the resistance of carbon black or graphite is too high to develop heat. For the purpose of reducing the resistance ($\Omega$) of a conductive heating unit to between several tenths and several hundredths that of a heating unit containing carbon black or graphite, attention can be directed to the use of metal powders.

However, the metal powders incorporated in coating solutions, even if they are finely pulverized, precipitate during storage of the conductive coatings or during the solidifying process of the liquid coating films because of their high specific gravity. Consequently, it is difficult to obtain uniform exothermic surfaces in heating units by using the metal powders. One possible solution to prevent this precipitation is to mix the coating with a thickener or a suspending agent. However, such prior art thickeners or suspending agents can not effectively disperse the metal powders, and hence only exothermic, electrically-conductive coatings partially different in resistance are obtained. For this reason, such coatings are unsuitable for surface heaters which must have uniform temperature distribution.

At present, therefore, there are no surface heaters which can be operated at low voltages, such as when batteries are used as power sources.

Electrically-conductive compositions are known which incorporate fine conductive particles in a binder to provide high electrical conductivity. In the patent to Grindrup et al. (U.S. Pat. No. 4,624,798), for example, fine particles ("microballoons") of a low-density magnetic material are coated with a noble metal such as silver and dispersed in an electrically non-conductive matrix to provide a composite material claimed to be highly conductive electrically. Grindrup et al. specifically provides that the microballoons must be of magnetic material, and that it is the magnetic nature of the particles which imparts the high electrical conductivity to the composite material since the magnetic attraction of the microballoons, combined with their low density, permits the particles to be attracted to each other to form the network of metal-to-metal surface contacts which imparts the composite material with its high electrical conductivity. In the patent to Abrams (U.S. Pat. No. 4,419,279), a conductive paste is formed of inorganic non-metallic particles coated with silver metal and dispersed in a matrix of organic or glassy material, together with solid particles of silver metal. The paste is used to make electrically-conductive elements used in capacitors.

Compositions such as these are alleged to have high electrical conductivity, and are used in applications in which good electrical conductivity is important. Such materials, therefore, would not be suitable for use in an exothermic application wherein good electrical resistivity characteristics are more desirable.

The use of magnetic particles, such as in the Grindrup et al. patent, which may be desirable in a composition of improved electrical conductivity, has been determined by the present inventor to be undesirable in a material for use in exothermic devices and actually result in such devices with inferior performance characteristics. Even at room temperatures, but especially at high temperatures, magnetic hollow particles are readily oxidized and easily corroded. Thus, they become chemically unstable and the electrical resistance becomes unstable. If magnetic hollow particles were to be used, an exothermic heater device could not be made. Even if a heater device were possible with the use of hollow magnetic particles, because of their low resistance to oxidation and corrosion, the heater would perform unstably and quickly suffer quality changes in the normal operating temperature range for such devices of about 50° to about 600° C.

SUMMARY OF THE INVENTION

It is, therefore, among the objects of the present invention to provide an electrically-conductive particle powder of fine, hollow, non-magnetic spherical particles plated with a metal coating; to provide an exothermic, electrically-conductive coating or paste incorporating the particle powder; to provide an electrically-conductive exothermic heating unit utilizing the coating or paste; to provide such a heating unit which exhibits uniform temperature distribution, is capable of significant temperature increase, over a large surface area, and possesses a temperature self-regulating property; to provide such a heating unit which is operable at low voltages; to provide a process for producing the heating unit; and to provide such a process wherein the exothermic coating does not have to be applied precisely.

These and other objects of the invention will be apparent from the following description.

The present inventor has discovered that fine, hollow, non-magnetic particles of resin or glass plated with a metal can be uniformly dispersed in an exothermic electrically-conductive coating film which, when coated onto a suitable supporting surface, provides an electrically-conductive heating unit which is operable at low voltages, has uniform temperature distribution and good temperature self-regulation.

The present invention provides a fine, electrically-conductive particle powder comprising fine, hollow, non-magnetic, spherical particles of glass or resin plated with a metal and having a bulk density of 0.2 to below 0.9 g/cm$^3$; an exothermic electrically-conductive coating or paste comprising this powder and a synthetic resin binder; a conductive heating unit having a desirable shaped solid or solid surface coated or impregnated with the above coating or paste; and a process for producing the conductive heating unit.

DESCRIPTION OF THE PREFERRED EMBODIMENT

Figure 1:
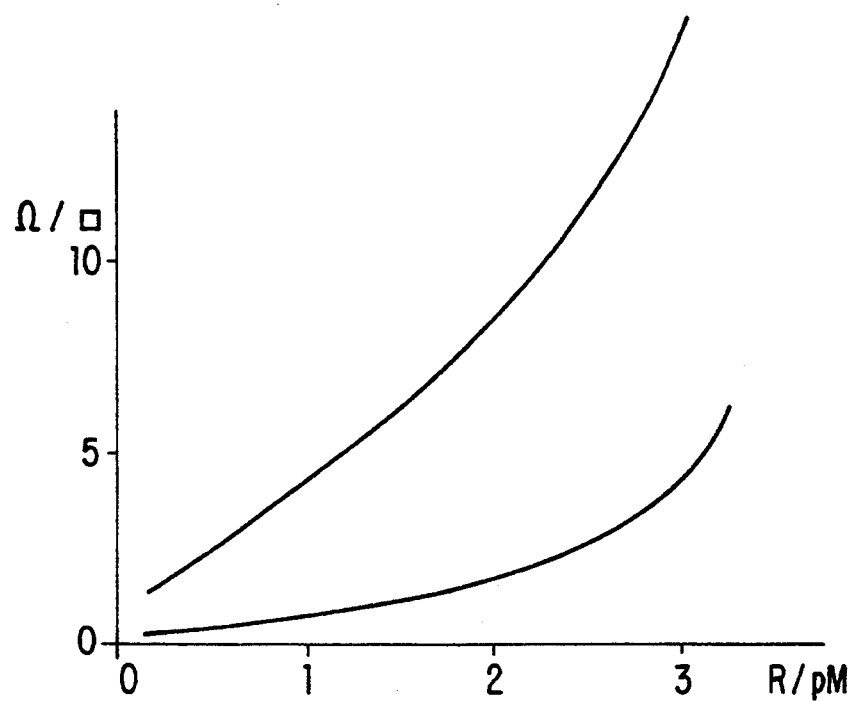
FIG. 1 is a graph showing the electrical resistance relative to the ratio of the resin to the conductive powder.

The fine, hollow spherical glass or resin particles used in the present invention include, for example, glass such as Scotch Light (registered trade mark), Glass Bubble (S60/10000 and so on, Sumitomo 3M) and resins such as polymethyl methacrylate (PMMA) and polystyrene. As the glass, soda-lime borosilicate glass (SiO$_2$ 54, Al$_2$O$_3$ 14, B$_2$O$_3$ 8.3, F$_2$O$_3$ 0.2, Na$_2$O 0.5, MgO 1, CaO 22, wherein the number following each component is the weight percent of that component) is used, and as heat-resistant resins, polyamide resins are used.

The size of the fine, hollow spherical glass or resin particles is suitably between 4 to 350 μm, preferably 10 to 200 μm. Use of particles smaller than 4 μm increases the resistance (Ω) of the surface heater too high. Particles larger than 350 μm are difficult to disperse in the coating, and are therefore undesirable. The thickness of the particle wall can be 0.5 to 2 μm.

The metal plating on the fine, hollow spherical glass or resin particles may be obtained by electrodeless plating, a combination of electrodeless plating and electrode plating, or the like. For the metal plating, Pt, Au, Ag and Ni preferably are used. Metals such as Cu and Sn are unsuitable because they are oxidized during use of the heating unit and increase the electrical resistance. Of the metals, Ag is satisfactory in both cost and stability in quality.

The thickness of the metallic deposits is not particularly limited, and can be selected by taking into account cost and particle dispersibility. The thickness is suitably about 0.03 to 0.8 μm, preferably about 0.1 to 0.3 μm. Deposits having a thickness of less than 0.03 μm increase the resistance (Ω) of the surface heater too much, and deposits having a thickness of more than 0.8 μm make it difficult to disperse the particles in the coating, thus increasing cost.

The bulk density of the fine, hollow, spherical metal-plated glass or resin particle powders is similar to that of the synthetic resin binders, namely 0.2 to less than 0.9 g/cm$^3$. If the bulk density is less than 0.2 g/cm$^3$, segregation occurs to reduce strength. On the other hand, if the bulk density is 0.9 g/cm$^3$ or more, precipitation occurs and dispersibility deteriorates.

As the synthetic resin binder for the conductive materials, there can be used thermoplastic, thermosetting and electron beam curable resins, which can be suitably selected depending on the application field of the heating unit. The thermoplastic resins have a softening point of at least 15° C. and a mean molecular weight of thousands to hundreds of thousands. The thermosetting resins or reactive resins have a molecular weight of not more than 200,000 in the state of coating solutions. The resins are heated after their coating and drying to infinitely increase their molecular weight by reactions such as condensation and addition. There can also be used radiation curable resins in which groups cross-linkable or polymerizable to dryness by radiation exposure are contained or introduced in the molecules of thermosetting resins. Such groups include acrylic double bond groups such as radical-polymerizable unsaturated double bond group contained in acrylic acid, methacrylic acid or their ester compounds, allylic double bond groups such as a group contained in diallyl phthalate, and unsaturated bond groups such as a group contained in maleic acid or its derivatives.

Examples of such synthetic resins include polyimide resins, amide resins, polyphenylene oxide resins, silicone resins, polytitanocarbosilane resins, phenol resins, epoxy resins, polyparabanic acid resins, polyurethane resins, polyester resins, polyetheretherketone resins, polyphenylene sulfide resins, Polyflon (a trademark of Osaka Kinzoku Kogyo, Ltd., Japan, for polytetrafluoroethylene) resins, polyolefin resins and polyvinyl chloride resins. There can be selected a resin having a softening temperature or a decomposition temperature depending on the temperature desired for the coated film.

The ratio of the amount of synthetic resin binder to the fine, hollow, spherical conductive particle powder is variously selected depending on the desired heating temperature, the area of the heating surface, the kind of fine conductive particle powder and the synthetic resin, combinations thereof and the like. However, the synthetic resin is generally used in a ratio of 25 to 360 parts by weight, preferably 30 to 200 parts by weight, to 100 parts by weight of the fine conductive particle powder.

When the ratio of the synthetic resin is less than 25 parts by weight, the electric resistance value decreases and the temperature of the heating unit can be elevated (therefore, applicable to a heating unit having a large heating surface). However, the strength of the coated film is insufficient, and the temperature coefficient of the electric resistance is reduced, thereby likely to produce temperature unevenness. On the other hand, when the ratio of the synthetic resin is more than 360 parts by weight, the electric current necessary for heating can not be obtained because of the excessive resistance value, resulting in unsuitability for practical use.

The applied voltage which can be used in the present invention is 0.5 to 200 v, and can be adjusted by varying the ratio of the synthetic resin binder to the fine conductive powder and the thickness of the film. For example, when the low voltage is applied from a battery, the amount ratio of the fine conductive powder is increased. According to the present invention, the surface temperature of the heating unit is stably heated at desired temperatures up to at most about 450° C. (at an environmental temperature of −30° to 40° C.) for a long time by combinations of the compounding of the coating, the thickness of the coated film, the applied voltage and the like.

The coating mainly comprising the fine, conductive particle powders and the synthetic resins are applied by various coating methods such as brushing, roller coating, spray coating, electrostatic coating, electrodeposition coating and powder coating, or by immersing methods. To the coatings, other additives or auxiliary agents may be added, such as diluting agents, suspending agents, dispersants, antioxidants, other pigments and other necessary additives.

As the diluting agents, there can be employed solvents used for coatings, such as aliphatic hydrocarbons, aromatic petroleum naphtha, aromatic hydrocarbons (for example, toluene and xylene), alcohols (for example, isopropyl alcohol, butanol and ethylhexyl alcohol), ether alcohols (for example, ethyl cellosolve, butyl cellosolve and ethylene glycol monoether), ethers (for example, butyl ether), acetates, acid anhydrides, ether esters (for example, methyl ethyl ketone and methyl isobutyl ketone), N-methyl-2-pyrrolidone, dimethylacetamide and tetrahydrofuran. The preferred solvent is suitably selected depending on the synthetic resin used as the binder. The diluting solvent is used in an amount of 400 parts by weight or less, per 100 parts by weight of the resin.

The suspending agents, used as required, include methyl cellulose, calcium carbonate and fine powders of modified bentonite. As the dispersants, various surface-active agents can be used, such as anionic surface-active agents (such as fatty acid salts and liquid fatty oil sulfate salts), cationic surface-active agents (such as aliphatic amine salts and quaternary ammonium salts), amphoteric surface-active agents and nonionic surface-active agents.

In order to achieve solidification to dryness or curing of the coatings of pastes with ease in a short time, curing agents can be added. The curing agent can be selected depending on the resin used, and there can be used known curing agents such as aliphatic or aromatic amines, polyisocyanates, polyamides, amines, thiourea and acid anhydrides.

In addition, stabilizers, plasticizers, antioxidants or the like can be suitably used.

The solids formed of substrates such as plastic materials, ceramic materials, woody materials, fibers, paper and metal materials coated with electric insulators in desired shapes, or the surfaces thereof are coated with or immersed in the exothermic conductive coatings of the present invention to produce the heating units.

For example, a substrate formed of metallic material coated with an electric insulating material, a ceramic material, a plastic material, a woody material or a combination thereof, to which at least two metal terminals are securely attached, is coated with the coating of the present invention to a thickness of about 0.2 to 3.5 mm (the thickness of the coated film after curing is 0.1 to 3 mm).

The shape of the substrate described above is not particularly limited, and may be a plane surface or a curved surface. The heating units can be formed of linear, rod-like, cylindrical, plane or other three-dimensional curved substrates.

Although it is desirable to coat the substrate surfaces with a ceramic material, woody materials are sometimes usable if the desired temperature is 150° C. or lower. There are also usable combined articles such as a composite comprising a woody material, a plastic material or a metallic material and a ceramic material applied thereon.

When the solid surface to be coated is large and brushing, roller coating or spray coating is adopted, the coating's fluidity is increased to improve workability thereof. In this case, a dilution solvent is preferably incorporated in an amount of not more than 400 parts by weight per 100 parts by weight of the conductive powder. If more solvent is incorporated, the coating is too fluid and it is difficult to obtain a prescribed thickness of the coated film. The use of excessive solvent therefore is unsuitable for obtaining a desired surface temperature of the coated film.

The coated film is cured, solidified to dryness or cured by electron beams (radiation) at a temperature ranging from about 70° to 350° C. When the solidification to dryness or the curing is conducted at a temperature ranging from about 70° to 350° C. for an ample time, a smooth film having a prescribed thickness can be obtained. Higher temperatures are undesirable because foaming, flowing, cracking and quality deterioration are liable to occur. Temperatures lower than 70° C. are also undesirable because curing then requires a lot of time.

When the coating is applied to a thickness of about 0.2 to 3.5 mm, followed by reaction at a temperature of not more than 350° C. to cure the coating, a coated film solidified to dryness and having a thickness of about 0.1 to 3.0 mm is obtained. This electric resistance heating coated film generates high temperature as well as low temperature. It is preferred that the coating be applied to a thickness of about 0.1 to 3.0 mm. If the thickness is less than 0.1 mm, the electric resistance increases too high, the output wattage per unit area decreases too low, and the film strength is insufficient. If the thickness is more than 3.0 mm, segregation is liable to occur by precipitation and separation of the particles, and a uniform coated film is difficult to obtain. The electric resistance between the metal terminals on this coated film is 0.1 to 300 $\Omega/\square$ at ordinary temperature, where $\Omega/\square$ represents electric resistance value per square area.

If there is concern of electrical leakage, the exothermic coated film may be covered with a thin, electric insulating film which is of sufficient thickness so that the strength is maintained. A film which is too thick film results in disturbance of heat transfer.

The heating units are similarly produced by treating fibers or paper with the coatings or pastes of the present invention containing the fine, hollow, spherical metal-plated particles and the synthetic resins.

Also, heating units having excellent surface properties can be obtained by use of electron beam (radiation) curable resins.

According to the exothermic conductive coatings of the present invention, the temperature of the heating units is adjustable to a desired temperature by the selection of the kind of fine, hollow, spherical metal-plated particles and the synthetic resin, the compounding ratio, the thickness of the coated film and combination thereof, and further by the selection of the heating area or the applied voltage.

The exothermic conductive coatings of the present invention have temperature self-controlling function. In particular, it is not necessary for the thickness of the coated films to be precisely uniform, so that the film coatings can be manually applied on the solid surfaces of any desired shape. Further, the heating units can be produced by immersing the impregnatable solid materials (such as fibers and paper) of a desired shape in the coatings. The heating units of the present invention can therefore be widely utilized in various fields, such as an interior wall application, flooring, roofing, a furnace inner surface use, pipe inner and outer surface applications, carpets, blankets, simplified heaters, warmers, antifreezes, signal covers and pots. In particular, the heating units are excellent as heaters for room heating and hot insulation and heating parts. According to the present invention, there can be obtained heating units having temperature self-controlling function, arbitrarily adjustable to any desired temperatures up to about 450° C. and further having a uniform temperature distribution over a large heating surface or a small heating surface in various shapes and surfaces, including an uneven surface. The inventor has successfully made a surface heater capable of temperatures to about 600° C. Previously, conventional heaters of this type have been capable only of temperatures of up to 300° C.

The present invention will be further described with reference to the following Examples. It is understood, of course, that these are not intended to limit the scope of the invention. As indicated above, the fine, hollow spherical particles of the present invention are of non-magnetic material. To assess the effect of using magnetic particles, such as in the Grindrup et al. patent, and the non-magnetic hollow particles of the present invention, and the improvements attained therewith by the latter, the tests in Examples 4 and 5 were conducted. In the following Examples, all parts are by weight.

EXAMPLE 1

A hollow, spherical, Ag-plated, conductive particle powder (PM) having a bulk density of 0.6 to 0.8 g/cm$^3$ and obtained by electrodeless plating hollow spherical particles (30 to 70 $\mu$m in size) of soda-lime borosilicate glass with silver to a deposit thickness of 0.1 to 0.2 $\mu$m was mixed with each of various synthetic resins (R) as the binders to prepare a coating. The coatings in which the R was compounded in amounts of 50, 100, 200 and 500 parts, respectively, per 100 parts of the PM were applied on 3 cm×3 cm glass plates each having terminals attached to both ends thereof to produce heating units having a film thickness of 1 mm. The electric resistance ($\Omega/\square$) was measured for each heating unit with an ohmmeter. The results fell between upper and lower curves showing the relationship between R/PM and $\Omega/\square$ in FIG. 1. The resistance differs according to the kind of resin used. For example, when the R/PM is 2, heating units high in resistance exhibited a resistance of 10 $\Omega/\square$ at ordinary temperature (one-pack type silicone and urethane resins) and heating units low in resistance exhibited a resistance of 3 $\Omega/\square$ (unsaturated polyester resins). The resistance of the heating units containing epoxy resins, polyamide resins, polyflon resins, polyetheretherketone resins, polytitanocarbosilane resins, polyphenylene oxide resins and the like fell between the above resistance values. It was shown that the resistance varied depending on the kind of resin and the manufacturing condition, and fell between the two curves shown in FIG. 1.

As is apparent from these results, it is seen that the resistance ($\Omega/\square$) increases with an increase in the amount of resin binder. This shows that heating units capable of generating various temperatures can be obtained by changing the kind of resin and the ratio thereof.

EXAMPLE 2

Figure 2:
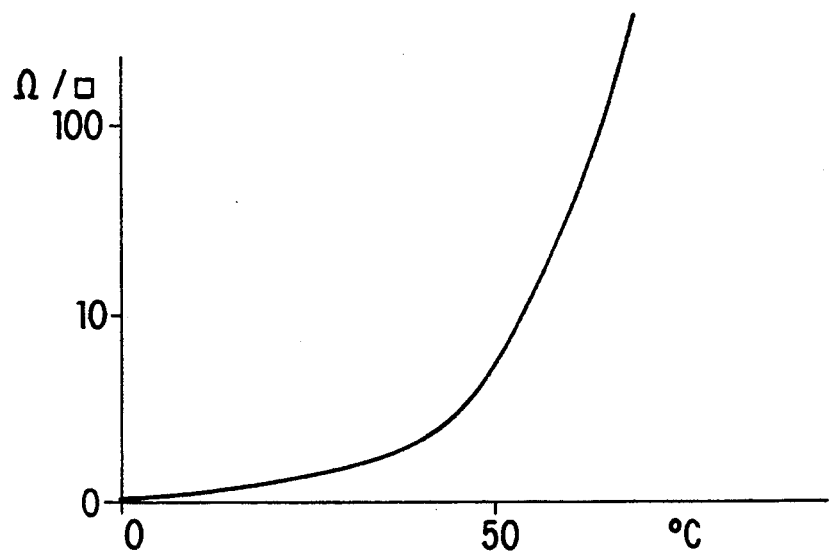
FIG. 2 is a graph showing the relationship between the exothermic temperature of the present invention and the electric resistance at 6 v power.

There were compounded 100 parts of hollow, spherical, Ag-plated glass particles (having a size of up to 70 $\mu$m, a metallic deposit thickness of 0.1 to 0.2 $\mu$m and a bulk density of 0.6 to 0.8 g/cm$^3$) obtained in the same manner as with Example 1 and 130 parts of one-pack type epoxy resin containing dodecenylsuccinic anhydride (DDSA) as the curing agent to prepare a conductive coating. The resulting coating was applied on a 10 cm×10 cm glass substrate to a thickness of 2 mm, followed by curing at 100° C. The relationship between the resistance ($\Omega/\square$) and the temperature in the surface heater thus obtained is as shown in FIG. 2. When a voltage of 6 v was applied to this heater, a surface temperature of 55° C. was obtained (the room temperature was 18° C.).

Estimated from this experiment, the temperature of the coated film having a resistance of 10 $\Omega/\square$ and a size of 172 cm×172 cm can be elevated to 55° C., when a voltage of 100 v was applied thereto.

EXAMPLE 3

A coated film containing 100 parts of hollow, spherical, Ag-plated glass particles (having a size of 30 to 70 $\mu$m, a metallic deposit thickness of 0.1 to 0.2 $\mu$m and a bulk density of 0.6 to 0.8 g/cm$^3$) and 60 parts of a polyamide resin was formed on a 95% Al$_2$O$_3$ ceramic plate (20 cm×20 cm in size and 2 cm in thickness). When a voltage of 24 v (144 watts) was applied to copper terminals embedded in the coated film in parallel with each other at both ends of the plate, a high temperature of 210° C. was obtained (the room temperature was 20° C.). When a voltage of 100 v was applied, the power was increased from 144 watts to 2,500 watts, and the temperature of the coated film having a size of about 80 cm×80 cm was elevated to 210° C. Thus, a surface heater having such a large heating area, which was previously not considered possible, was obtained. In contrast, with respect to prior art surface heaters, an SiC, Ni-Cr heater only has a maximum size of 15 cm×30 cm, and a temperature elevated to 200° C. at 100 volts.

EXAMPLE 4

Magnetic microballoons ("Q-Cells") from the PQ Corporation, Valley Forge, Pa., described in the Grindrup et al. patent, were silver-plated by electrodeless plating. The magnetic, Ag-plated microballoon particles were mixed with epoxy resin in a ratio of 97 g of epoxy resin (comprised of 50 g resin with 47 g curing agent) per 100 g of particles to obtain a paste. The paste was applied at a rate of 0.2 g/cm$^2$ onto an insulated plate obtained by adhering heat-resistant polyester tape (#900, Sekisui Chemical Co., Ltd., Japan) onto a 0.5 mm-thick aluminum plate, to which copper terminals (5 mm wide and 30 mm long) were embedded 30 mm apart, and heated at 140° C. for 8 hours to be cured.

Figure 3:
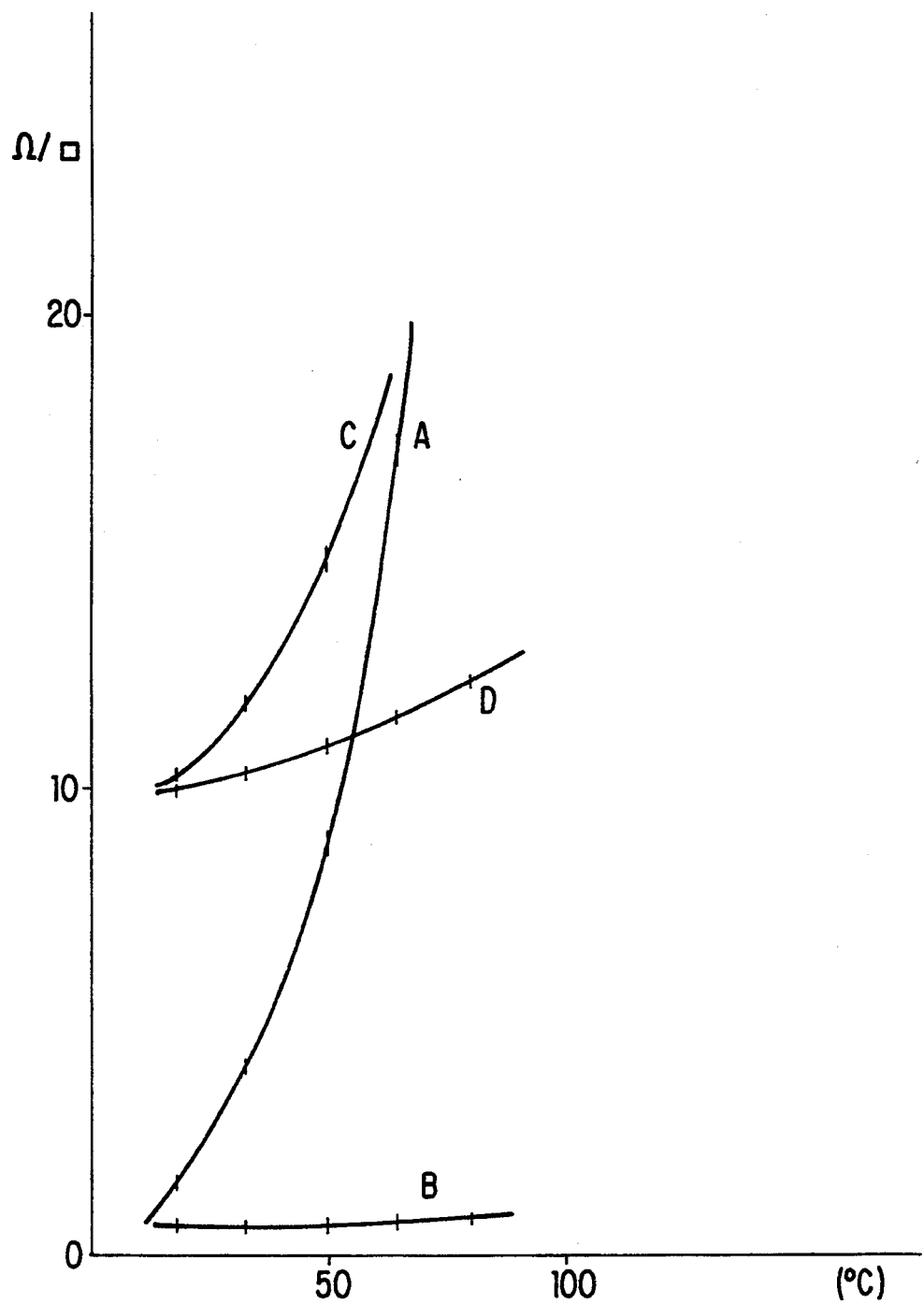
FIG. 3 is a graph comparing the relationship between exothermic temperature and electric resistance for exothermic devices according to the present invention and devices using magnetized conductive particles.

After curing, a voltage (controlled to 10 w/9 cm$^2$) was applied to the copper terminals, and the relationship between temperature and electrical resistance was determined as in the above Examples, and is shown by curve B in FIG. 3.

As a comparison, silver-plated and non-magnetized microspheres (from the 3M Corporation) of the present invention, were mixed with 0.97 epoxy resin (0.5 resin with 0.47 curing agent) to obtain a paste which was applied to an insulated plate in the same manner as for the Q-Cell microballoon paste, and cured as described above. A voltage (as above) was applied to identical copper terminals embedded in the paste, and the relationship between temperature and electrical resistance is shown by curve A in FIG. 3.

As is apparent from curves A and B in FIG. 3, the silver-plated, non-magnetic microspheres of the present invention shows an excellent positive temperature coefficient (PTC), while the magnetized Q-Cell microballoons do not exhibit any PTC.

EXAMPLE 5

Hollow, spherical, glass particles (diameter: 50 μm) having 0.3 μm thick nickel plating were placed in a 5000-gauss magnetic field to be magnetized. A paste was obtained by mixing the magnetized glass particles with 0.97 of epoxy resin (0.5 resin with 0.47 curing agent). The paste was applied at a rate of 0.2 g/cm² onto an insulated plate obtained by adhering heat-resistant polyester tape (#900, Sekisui Chemical Co., Ltd., Japan) onto a 0.5 mm-thick aluminum plate. Copper electrodes (5 mm wide and 55 mm long) were embedded in the paste 105 mm apart, and the paste heated at 140° C. for 8 hours to be cured.

After curing, a voltage (controlled to be 10 w/9 cm²) was applied to the copper terminals, and the relationship between temperature and electrical resistance was determined as in the above Examples, and is shown by curve D in FIG. 3.

As a comparison, nickel-plated and non-magnetized microspheres (from the 3M Corporation) of the present invention, were mixed with epoxy resin in a ratio of 1 part microspheres with 0.97 part epoxy resin (0.5 part resin with 0.47 part curing agent) to obtain a paste which was applied to an insulated plate in the same manner as for the magnetized glass particle paste, and cured as described above. A voltage (as above) was applied to identical copper terminals embedded in the paste, and the relationship between temperature and electrical resistance is shown by curve C in FIG. 3.

As is apparent from curves C and D in FIG. 3, the nickel-plated, non-magnetic microspheres of the present invention exhibit an excellent PTC, but the nickel-plated, magnetized glass particles exhibit little PTC effect.

I claim:

1. An electrically conductive exothermic coating or paste comprising an electrically conductive particle powder and a synthetic resin binder in a ratio of about 25 to about 360 parts by weight of resin binder to 100 parts by weight of particle powder, said powder having a bulk density of 0.2 to below 0.9 g/cm³ and comprising non-magnetic hollow spherical particles of glass or of a heat-resistant resin, said particles being between 4 to 350 μm in size and plated with a metallic material to a thickness of at least 0.03 μm, said metallic material being stable against oxidization during use, said coating or paste producing heat upon application of an electric voltage.

2. An exothermic conductive coating or paste as defined in claim 1, in which said synthetic resin binder is at least one resin selected from the group consisting of a silicone resin, a urethane resin, an epoxy resin, a polyamide resin, a polyester resin, a polyimide resin, a polyolefin resin, a polytetrafluoroethylene resin, a polyetheretherketone resin, a polyphenylene sulfide resin and a polytitanocarbosilane resin.

3. An electrically conductive exothermic heating unit operable at low voltages obtained by applying to a substrate an exothermic composition as defined in claim 1, or 2, said substrate being a shaped solid or a solid surface.

* * * * *